Sept. 10, 1935.  A. H. STENERSEN  2,014,150
APPARATUS FOR MOLDING OBJECTS OF PYRALIN AND
OTHER MATERIAL THAT IS PLASTIC WHEN HEATED
Filed Oct. 24, 1931  4 Sheets-Sheet 1
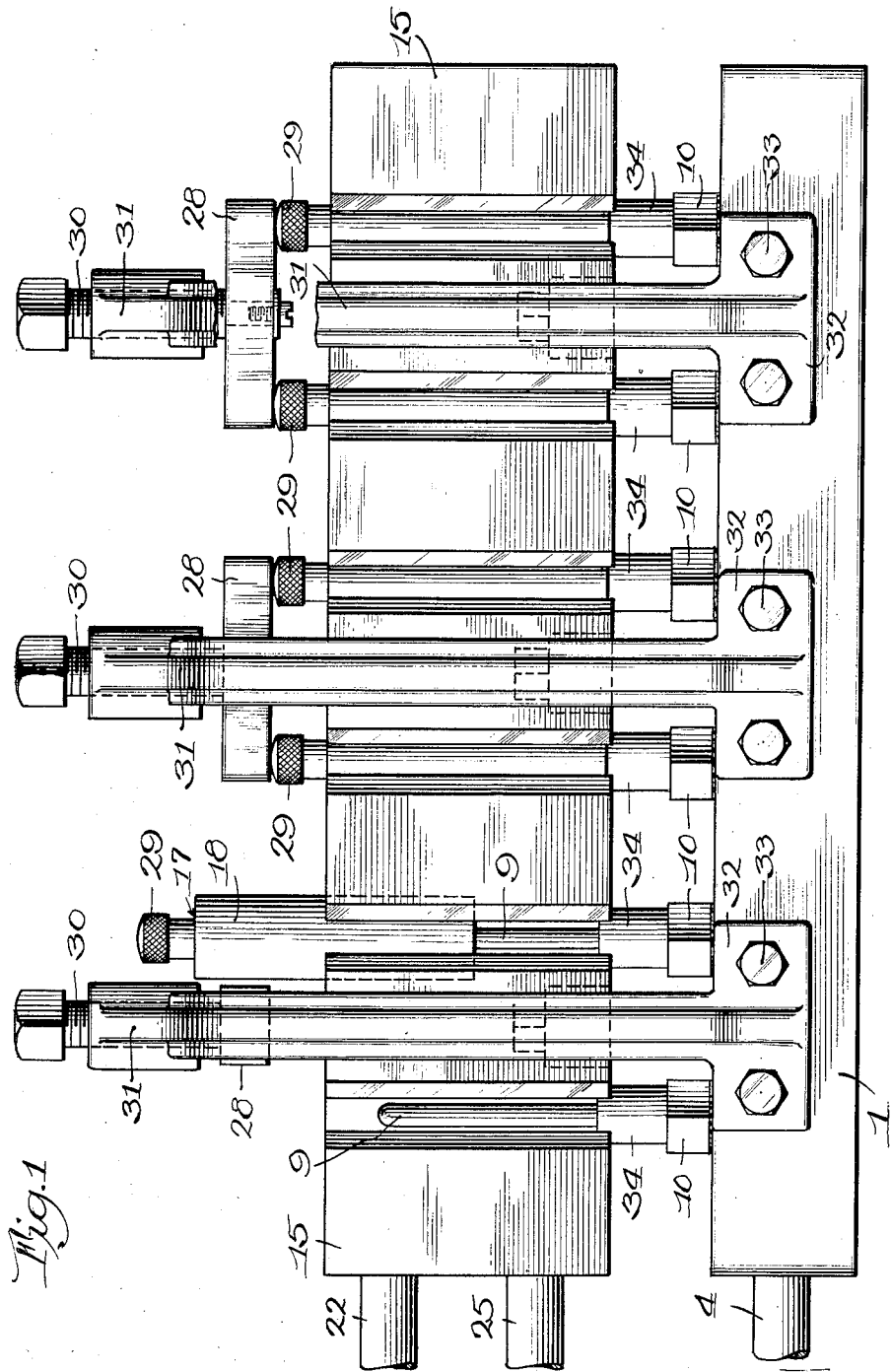

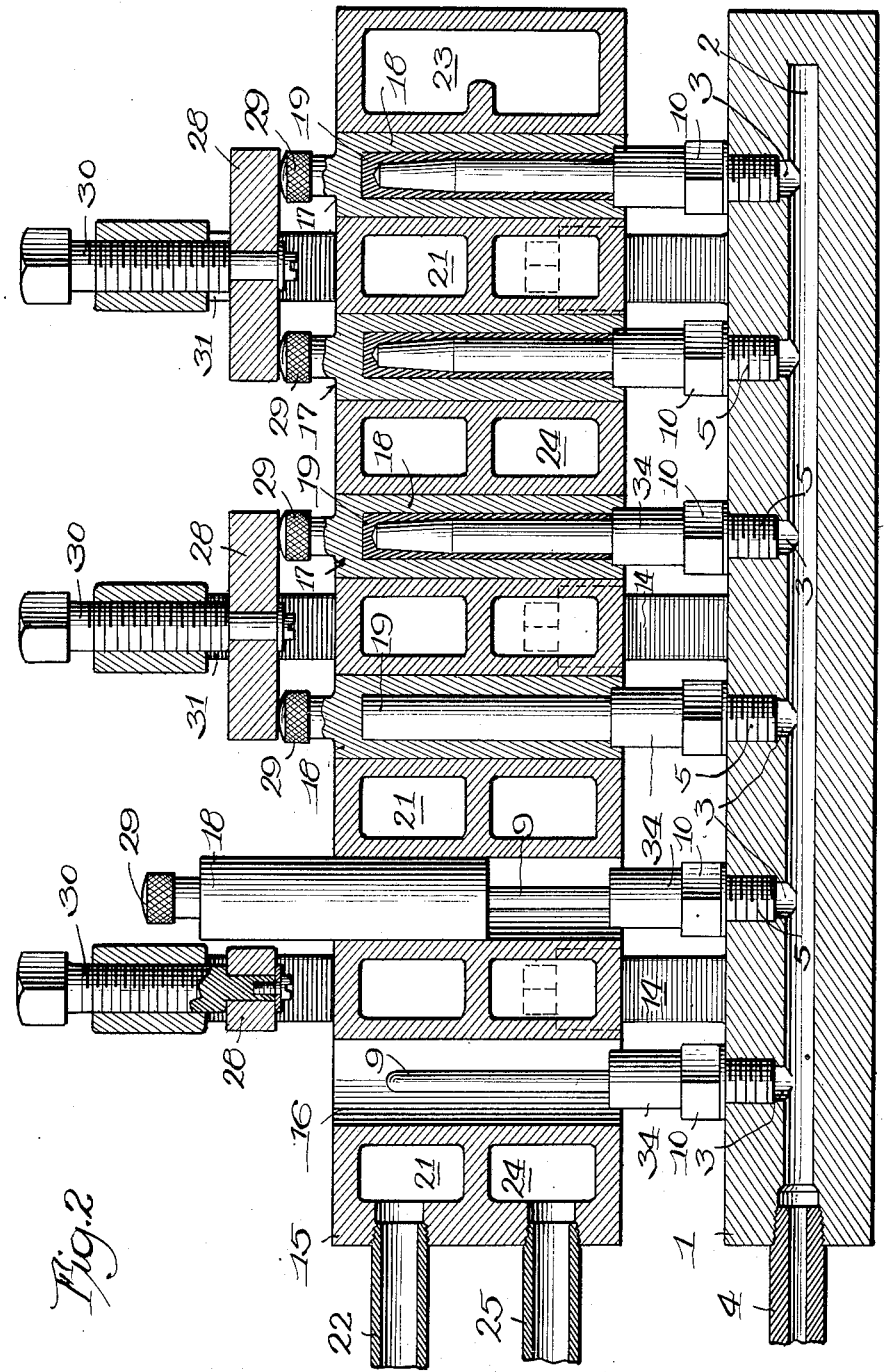

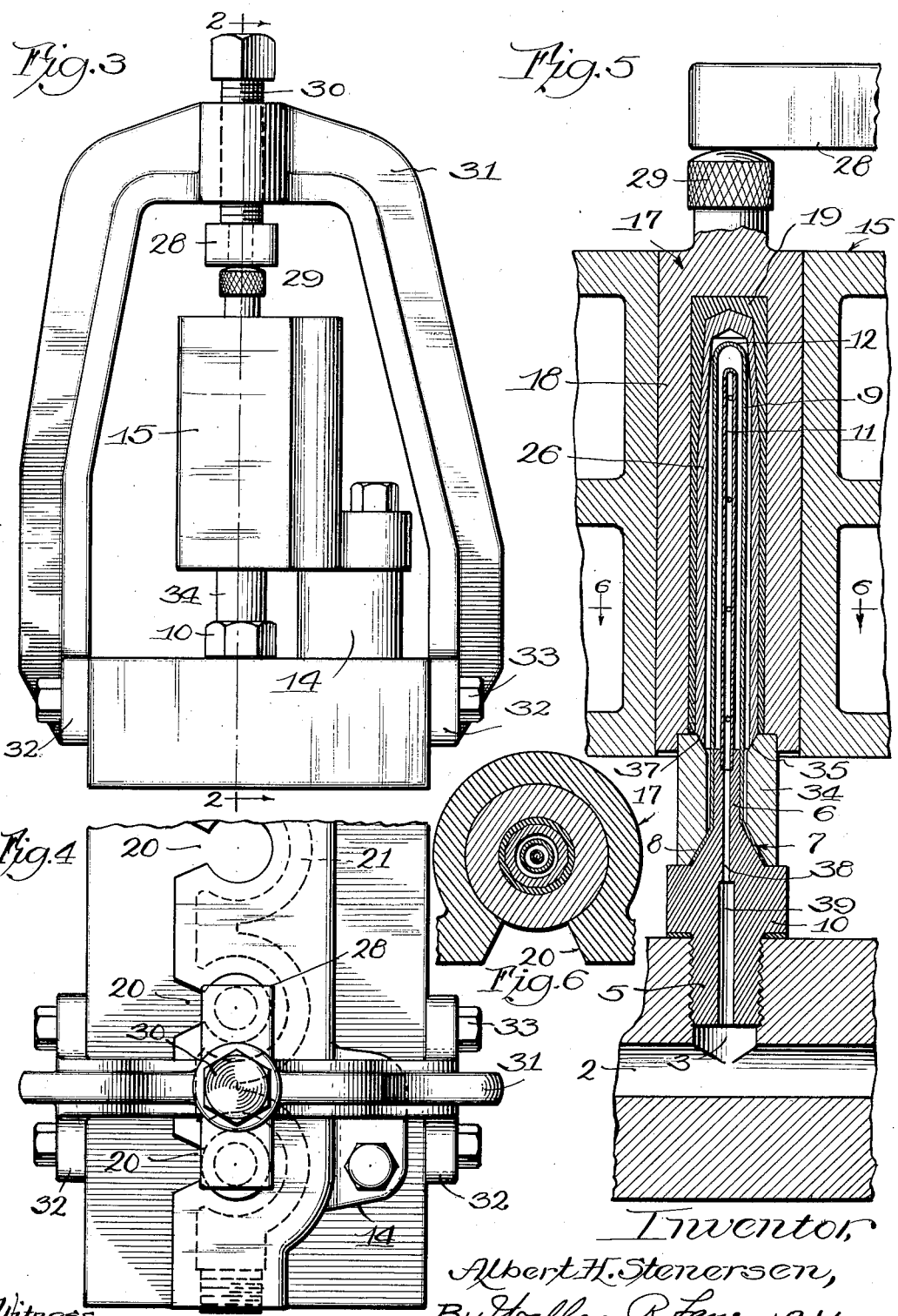

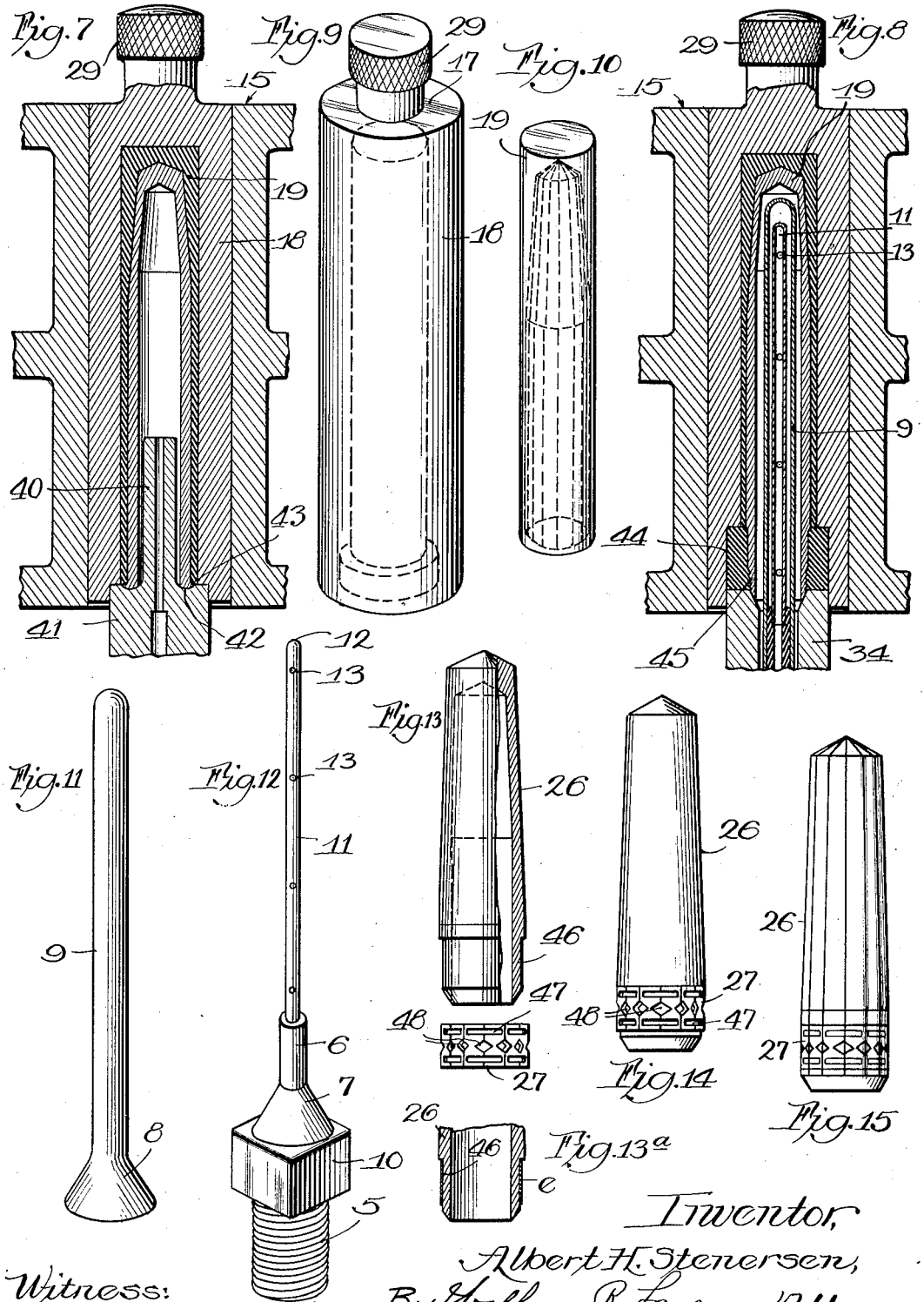

Patented Sept. 10, 1935

2,014,150

UNITED STATES PATENT OFFICE 2,014,150

APPARATUS FOR MOLDING OBJECTS OF PYRALIN AND OTHER MATERIAL THAT IS PLASTIC WHEN HEATED

Albert H. Stenersen, Chicago, Ill., assignor to The Wahl Company, Chicago, Ill., a corporation of Delaware Application October 24, 1931, Serial No. 570,898

14 Claims. (Cl. 18—17)

This invention relates to the molding of articles from material that may be rendered plastic by heating, as, for example, "Pyralin," and the like, and comprises the provision of improved apparatus and method adapted for that and similar uses.

A general object of the invention is the provision of improved apparatus for such uses, which affords means for expeditiously heating and cooling the material operated on, and which facilitates the charging of the mold with the material to be shaped, and the removal of the molded article from the mold.

Another object of the invention is the provision of such apparatus which is adapted to perform very fine and precise work and by which the shaping of the article in the mold is accomplished by the application to it of a high degree of fluid pressure, the character of the apparatus being such as to avoid undesirable localized displacement of the material in the molding.

Another object is the provision of an improved construction of molding apparatus wherein the molding pressure is transmitted to the material through the medium of an expansible sac, the construction and arrangement of parts being such as to facilitate the proper positioning of the sac in the mold, avoid loss of pressure fluid during the molding operation, and securely retain the sac in desired relationship with the mold and molded article.

Still another object of the invention is the provision of apparatus for molding plastic articles by fluid pressure and wherein the application of the pressure is so controlled as to prevent its forcibly impacting the plastic material in a manner such as to result in the disproportionate of the thinning of the material in localized areas.

A further object is to provide improved means for molding threads on hollow articles such as fountain pens, and the like.

Another object is to provide novel nozzle means for introducing the fluid pressure into the article being molded.

A further object is to provide novel means and method for uniting ornamental bands or mountings to molded articles, such as fountain pen caps, barrels, or other hollow objects, so as to produce inlay of the mountings in the molded article.

Another object is to form the tubular blanks from flat material prior to molding.

Further objects, advantages and capabilities will later more fully appear.

My invention further resides in the combination, construction and arrangement of parts illustrated in the accompanying drawings, and while I have shown therein a preferred embodiment I wish it understood that the same is susceptible of modification and change without departing from the spirit of my invention.

In the drawings:—

Fig. 1 is a side elevation of one form of apparatus embodying my invention, the mold socket at the left end being vacant, the next mold socket having a mold partially inserted therein, but with the clamping means out of clamping position, and the four other mold sockets having molds clamped in operating position therein.

Fig. 2 is a vertical longitudinal sectional view taken on the line 2—2 of Fig. 3.

Fig. 3 is a right hand end elevation of the apparatus illustrated in Fig. 2.

Fig. 4 is a fragmentary plan view of a portion of the same apparatus showing the clamping means for clamping two adjacent molds in the block.

Fig. 5 is a vertical longitudinal section through one of the molds and associated parts.

Fig. 6 is a horizontal transverse section on the line 6—6 of Fig. 5.

Fig. 7 is a fragmentary sectional view similar to Fig. 5, but showing a modified form of construction.

Fig. 8 is a view similar to Fig. 5, but showing a modification including means for molding threads on the article.

Fig. 9 is a perspective view of a mold of the form shown in the preceding figures.

Fig. 10 is a perspective view of a mold insert.

Fig. 11 is a perspective view of a flexible sac.

Fig. 12 is a perspective view of a nozzle having a sac stay.

Fig. 13 is a side elevation partly in section of a cap for a fountain pen formed ready to receive the ornamental bands prior to the band being positioned thereon, the band also being shown just below the cap ready to be applied thereto.

Fig. 13a is a section of a fragment of the lower portion of a similar blank having a thin band of "Pyralin," or the like, fitted thereon.

Fig. 14 is a side elevation of a cap for a fountain pen with a band mounting applied thereto preliminary to the molding operation.

Fig. 15 is a view of the article shown in Fig. 14, as completed by molding operation.

Referring in detail to the illustrative embodiments of the invention shown in the drawings, it will be seen that the apparatus comprises a support portion or manifold 1 which, as seen in Fig. 2, is provided with a longitudinal cavity 2 and with a plurality of channels 3 communicating with the cavity at suitably spaced intervals and leading to the exterior of the support. Suitably connected with the cavity 2 is a pipe 4 which is connected to any suitable source of pressure fluid supply. Threaded into the openings 3 are tubular extensions 5 of nozzles 6 (see Fig. 12) which nozzles, as will later be more fully understood, conduct the pressure fluid to the inside of the article being molded. At the base of the nozzle 6 is a conical shaped or tapered portion 7 upon which is clamped the skirt 8 of the flexible sac 9 (see Fig. 11). To facilitate the nozzle 6 being screwed into openings 3, it is provided with a noncircular portion 10 between the threaded extension 5 and the conical portion 7.

Firmly secured to the outer end of nozzle 6 is a stay tube 11 having a closed end 12 and any desirable number of lateral openings 13 for flow of pressure fluid from the tube 11 into sac 9 during the molding operation. It is pointed out that the closed end 12 of tube 11 prevents the impinging of a forcible jet of pressure fluid directly upon the upper end of sac 9. By causing the pressure fluid to pass laterally from the tube 11 through openings 13, the sac may be quickly filled with the pressure medium and distended in all directions to press the molded article uniformly against all surfaces of the mold cavity. Secured to projections 14 on the support 1 (see Fig. 3) is the mold block 15 which is provided with a plurality of mold sockets 16, each of a size to receive closely and slidably a mold 17. Each mold comprises an outer member 18 and an inner member or insert 19. The respective sockets 16 are arranged in alignment with respective nozzles 6, and are preferably cylindrical in form, each having a lateral opening or slot 20 extending longitudinally thereof. This lateral opening affords a view aperture through which the operator may observe the relationship of the sac and the mold in the operation of telescoping the latter over the former as the mold is slid into the mold socket. While I have shown the mold sockets 16 as preferably cylindrical in form, it will be understood that other shapes may be used without departing from the spirit of my invention.

Block 15 is provided with internal passages 21 connected at one end of the block with pipe 22, which leads from a suitable source of heating fluid such as steam. At the opposite end of the block, passages 21 communicate through opening 23 with return passages 24 to permit the steam to proceed to an outlet pipe 25. Pipes 22 and 25 will be provided with suitable valves and other pipe connections so that the steam may be turned off after it has sufficiently heated the material for molding and water turned in through pipe 22 to pass through openings 21, 23 and 24 and out through pipe 25 for cooling the molded article to cause it to harden. During this operation of molding and cooling, the fluid pressure from manifold 1 will be maintained in the interior of the mold.

One of the blanks 26 to be molded into the desired shape, is shown in Fig. 13. The blanks are tubular or hollow, the cavity being open at one end. The blank may or may not have, as desired, an ornamental band 27 applied thereto. The method of molding this ornamental band in place will be more fully pointed out hereinafter.

Assuming for the present that the blank 26 is to be without an ornamental band, this blank, which may be round in cross-section, will be inserted lengthwise into the insert or inner portion 19 of the mold 17 with its open end toward the open end of the mold cavity. Then the insert 19, either before or after it is inserted into the outer portion 18 of the mold, as desired, will be telescoped over the sac 9 (see Figs. 1, 2, 5 and 10). I prefer to place the insert 19 within the outer portion 18 prior to placing the same over the sac 9, whereupon the mold may be slid longitudinally into the mold socket as is shown in the second mold from the left in Figs. 1 and 2, thus maintaining the parts in proper alignment for insertion of the sac into the cavity of the blank. As will be apparent, a clear vision of sac 9 will be had through longitudinal slot 20 as the mold is being slid into the block, so that if the sac should sag out of alignment or become caught in the blank during the telescoping movement of the mold, the mold may be stopped or withdrawn and the difficulty corrected before the sac is injured. When a mold has been thus moved to its limit of movement in its socket 16, where its open end abuts a mold-closing member as hereinafter described, another mold is similarly positioned in an adjacent socket, whereupon the clamping bar 28 may be swung to a position for engagement with the heads 29 of the two molds and clamping screw 30, which is mounted in yoke 31, then tightened to securely clamp the molds in place. Yoke 31 is rigidly secured by screws 33 to the support 1. The open end of the mold, when thus clamped in the block, abuts a mold-closing member or clamping sleeve 34 (see Fig. 5) which is preferably formed with upper and lower internal beveled surfaces 35 and 36. The lower bevel 36 of this clamping sleeve bears upon skirt 8 of sac 9, wedging it on the conic surface 7 to clamp it tightly and evenly in position so as to hold it securely against displacement by the internal pressure. The blank 26 is preferably beveled at its open end at 37, which beveled portion overlaps and contacts with the internal bevel 35 of sleeve 34 to form an outwardly supported seal across the meeting line of the mold and sleeve, such as to prevent the sac 9 being forced into the joint by the high pressure applied.

The parts thus being assembled in the relationship shown in cross-section in Fig. 5, steam is passed through passages 21 and 24, which follow the contour of the sockets 16, for a sufficient length of time to heat the material of blank 26 sufficiently to render it plastic. Thereupon the pressure fluid is introduced through passages 2 and 3 and tubes 11 into the sacs, expanding the latter and pressing the plastic material of the blanks outwardly into uniformly close contact with the surfaces of the mold cavities, thereby molding the blanks to the desired forms.

The fluid pressure, which will be of considerable intensity, is maintained in the mold while the steam is cut off and cooling water passed through the passages in block 15 for such time as is requisite to set the molded article in the molded form. Thereupon the fluid pressure in the manifold may be relieved, the cooling water cut off and the mold with the molded article therein removed from block 15 by loosening clamping screw 30 and swinging clamping bar 28 free of the mold heads 29.

By virtue of the close and extensive surface contact of the molds 18 with the walls of the mold cavities, there will be very rapid transfer of heat between the material in the mold cavities and the heating or cooling medium in the passages 21 of the mold block. While I have shown in the drawings a mold having its cavity or matrix formed with a plurality of flat sides or faces, any other desired form of matrix may be used, such as to give the article the desired shape, so long as it is such as to permit the withdrawing of the completed article from the mold cavity.

In Fig. 7 I have shown a modified construction. In this case the nozzle is designated by the reference numeral 40 and is mounted on a mold-closing member 41, which takes the place of the interiorly beveled sleeve 34 of the form shown in Fig. 5. This mold-closing member 41 is shaped with a rounded trough 42 encompassing the nozzle. In the use of this form, when the mold is clamped in place, the material at the open end of the blank is forced into this trough or channel 42, thereby overlapping the meeting line between the mold and mold-closing member 41 and aiding to seal that joint against leakage. The slight wire edge 43 formed on the article where it underlies the lower end of the insert 19 may be removed by grinding or polishing after the article is removed from the mold.

In the modified arrangement illustrated in Fig. 8, a separate sleeve 44 is arranged in the lower end portion of the mold, which sleeve is formed in its lower interior wall with threads 45 which, as will be readily understood, mold corresponding threads on the exterior of the bottom portion of the blank when molded. This sleeve is held in place in the mold by abutment against the mold-closing member 34, and may be unscrewed from the thread which it forms on the molded article either before or after the latter is removed from the mold. The forming of the thread in this fashion avoids the expense of cutting such threads on the molded article by machinery, and insures uniformity of size.

Referring more in particular to the molding of the ornamental bands 27 on the blanks, an inspection of Fig. 13 will show the blank 26 as having a depressed circumferential portion 46 ground, turned or otherwise formed thereon, over which depressed portion 46 is slipped the ornamental band 27, preferably with sufficient friction to hold the band against slipping off. The band may be provided with any desired ornamentation, it being here shown as reticulated with openings and slots. The band having been fitted in position upon the blank as described above, the blank is placed within the mold cavity and the mold with the blank therein is then inserted into one of the sockets 16 in block 15 in alignment with a nozzle, and the parts assembled and clamped together as described above. The steam is then turned on to heat the blank sufficiently to render it plastic, the pressure fluid turned on to press the blank outwardly into conformity with the shape of the mold cavity, and while the fluid pressure is maintained the steam is cut off and cooling water turned in to cause the molded article to set or harden, after which the clamp is thrown off and the mold removed for removal of the molded article. This molding operation will press the plastic material of the blank through the openings 47 and 48 and across the edges of the reticulated ornamental band until it contacts with the walls of the mold cavity, and the band having been shaped originally to fit accurately the interior contour of the mold, the material of the blank will be molded flush with the peripheral surface of the band. This produces an inlay of the band in the material of the blank, some of the latter filling the openings of the band, and firmly secures the band in position on the blank. This inlay effect is seen more clearly in Fig. 15. As stated above, the ornamental bands may be provided with any desired ornamentation, and, if desired, the edges of the bands may be irregular instead of straight. Also, if desired, a thin shell of "Pyralin", or other suitable material susceptible of combining with the material of the blank and of a color different from the color of the blank, may be slipped over the depressed portion 46 before applying the band thereto, as shown at e in Fig. 13a, so that the inlay effect produced in the band by the molding may be had also in any desired color differing from the color of the blank.

While my invention has been illustrated in the drawings as particularly adapted to the forming of parts for writing implements such as barrels and caps for fountain pens and barrels for mechanical pencils, and the like, it is to be understood that my invention is equally applicable to the forming of parts for other uses as may be desired. While any suitable fluid pressure of any intensity to produce the desired result may be used I have found hydraulic pressure of approximately 2000 to 3000 pounds per square inch to give satisfactory results in molding objects of pyralin. I do not wish, however, to be limited to these pressures or this material, as it is clear that other pressures and other materials may be used without departing from the spirit of my invention.

Having thus described my invention, I claim:—

1. Molding apparatus comprising, in combination, a support affording a passage for pressure fluid, a nozzle supported on said support and communicating with said passage, a mold block having a mold socket aligned with said nozzle, a mold movable longitudinally of the nozzle into and out of said mold socket at the end thereof opposite the support, and means for securing the mold in the mold socket in fixed association with the nozzle.

2. In molding apparatus, in combination, a nozzle, means for conducting pressure fluid to said nozzle, a mold block arranged in fixed relationship to the nozzle and having a mold socket aligned longitudinally therewith, said mold block being equipped for application of heat thereto, a mold movable into the mold socket at the end opposite the nozzle and into encompassing relationship therewith, and means for holding the mold in the mold socket in surface contact with the mold block.

3. In molding apparatus, in combination, a nozzle, means for conducting pressure fluid thereto, a mold block in fixed relationship with said nozzle and having a mold socket into which the nozzle projects, and a mold movable into and out of the mold socket longitudinally of the nozzle, said mold block being provided with an opening to one side of the nozzle through which the portion of the nozzle in the mold socket may be observed.

4. In molding apparatus, in combination, a nozzle, means for conducting pressure fluid to the nozzle, a mold block in fixed association with the nozzle, said mold block having a mold socket aligned with the nozzle, an expansible sac communicating with the nozzle and extending within the mold socket, and a mold movable into the mold socket longitudinally of the nozzle into encompassing relationship with the sac, said mold block being provided with an aperture opening laterally from the mold cavity through which the sac may be manipulated during movement of the mold into the socket.

5. In molding apparatus, in combination, a nozzle, means for conducting pressure fluid thereto, a mold block having a mold socket aligned longitudinally with the nozzle, a mold movable into and out of said socket longitudinally of the nozzle, a mold-closing member associated with the nozzle for closing abutment with the end of the mold about the nozzle, and means for securing the mold in abutment with said mold-closing member.

6. In molding apparatus, in combination, a nozzle, means for conducting pressure fluid thereto, a mold block having a mold socket in approximately coaxial alignment with the nozzle, a mold movable into and out of said socket longitudinally of the nozzle, and means for securing the mold in the mold socket, the mold and the mold socket having wall portions adapted for close surface contact, the mold block being provided with a cavity for conducting heating fluid into heat-transferring relationship with said socket walls.

7. In molding apparatus, in combination, a support, a nozzle supported thereby, means for conducting pressure fluid to the nozzle, an expansible sac housing the outlet portion of said nozzle, a rigid member encompassing the nozzle and projecting within the open end of the sac, a mold-closing member encompassing the sac and engaging its open end portion externally, a mold movable longitudinally of the nozzle into and out of abutment with the mold-closing member and housing relationship with the sac, and means for pressing said mold upon said mold-closing member to press the latter into clamping engagement with the open end portion of the sac.

8. In molding apparatus, the combination as specified in claim 35 and wherein said rigid member has a tapering surface bearing against the inner surface of the sac and said mold-closing member has a tapering surface bearing against the outer surface of the sac.

9. In molding apparatus, in combination, a nozzle, means for conducting pressure fluid thereto, a mold movable longitudinally of the nozzle into and out of covering relationship thereto, an expansible sac communicating with the nozzle and extending within the mold and having an open end portion in encompassing relationship to the nozzle exteriorly of the mold, and a mold-closing member encompassing the sac and adapted for abutment at one end with the open end of the mold about the sac and at its other end for holding engagement with the open end portion of the sac.

10. In molding apparatus, in combination, a nozzle, means for conducting pressure fluid thereto, an expansible sac communicating with the nozzle, a stay member mounted on the nozzle and extending into the sac in position to support the latter approximately in alignment with the nozzle, a mold movable longitudinally of the nozzle into and out of enveloping association with the sac, and a mold-closing member supported for end abutment with the mold about the sac.

11. In molding apparatus, the combination as specified in claim 10 and wherein said stay member is provided with a passage and lateral outlets for conducting pressure fluid from the nozzle into the sac.

12. In molding apparatus, in combination, a nozzle, means for conducting pressure fluid thereto, an expansible sac communicating with the nozzle, a mold movable longitudinally with respect to the nozzle and having a mold cavity adapted to receive a portion of the sac, and a mold-closing member adapted for sealing contact with the mold about the open end of the mold cavity, said mold-closing member having a bore wall encompassing the sac and tapering from the mold-contacting end of said member.

13. In molding apparatus, in combination, a manifold member affording a conduit for pressure fluid, a plurality of nozzles mounted thereon and communicating with said conduit, a mold block provided with a plurality of mold sockets aligning respectively with respective nozzles, molds movable into and out of said mold sockets at the ends thereof opposite the nozzles, said molds having mold cavities adapted to receive portions of the nozzles, said block being equipped for application of heat to the molds, means for closing the open ends of the molds about the nozzles, and means for holding the molds in the mold sockets.

14. In molding apparatus, the combination as specified in claim 13 and including means retaining said mold block in fixed relationship to said manifold.

ALBERT H. STENERSEN.

CERTIFICATE OF CORRECTION

Patent No. 2,014,150.  September 10, 1935.

ALBERT H. STENERSEN.

It is hereby certified that error appears in the printed specification of the above numbered patent requiring correction as follows: Page 4, first column, line 46, claim 8, for "35" read 7; and that the said Letters Patent should be read with this correction therein that the same may conform to the record of the case in the Patent Office.

Signed and sealed this 17th day of December, A. D. 1935.

Leslie Frazer
Acting Commissioner of Patents.

(Seal)